United States Patent [19]
Takiguchi

[11] Patent Number: 5,898,656
[45] Date of Patent: Apr. 27, 1999

[54] OPTICAL DISC-SHAPED RECORDING MEDIUM RECORDING DEVICE AND METHOD FOR SETTING ILLUMINATION POWER THEREOF

[75] Inventor: Taizo Takiguchi, Kanagawa, Japan

[73] Assignee: Sony Corporation, Tokyo, Japan

[21] Appl. No.: 08/918,989

[22] Filed: Aug. 27, 1997

[30] Foreign Application Priority Data

Aug. 29, 1996 [JP] Japan ................................. 8-228971

[51] Int. Cl.$^6$ ....................................... G11B 7/00
[52] U.S. Cl. ................. 369/59; 369/48; 369/124
[58] Field of Search ................... 369/59, 42, 48, 369/49, 50, 54, 58, 32, 124

[56] References Cited

U.S. PATENT DOCUMENTS

| | | | |
|---|---|---|---|
| 5,455,815 | 10/1995 | Ishida et al. | 359/59 X |
| 5,563,862 | 10/1996 | Udagawa | 369/54 |
| 5,715,228 | 2/1998 | Takiguchi . | |

Primary Examiner—Muhammad N. Edun
Attorney, Agent, or Firm—Limbach & Limbach L.L.P.

[57] ABSTRACT

A driving device and a calibration method for an ablation write-once type optical disc in which the recording light volume can be calibrated accurately without using an overpower for positively recording data on the ablation write-once type optical disc. A playback output by an optical head 3 for recording/reproducing data by scanning an ablation write-once type optical disc 1 with a laser light beam is supplied to an optimum recording light volume decision unit 4. A light recording data controller 6 controls a laser driving controller 5 for controlling the laser light volume of an optical head 3 for recording two different recording patterns with different repetition periods with various recording light volumes. The optimum recording light volume decision unit 4 detects the asymmetry amount from the playback outputs of the two different recording patterns and determines an optimum recording light volume of the ablation write-once type optical disc 1 based on the asymmetry amounts at the various recording light volumes.

14 Claims, 7 Drawing Sheets

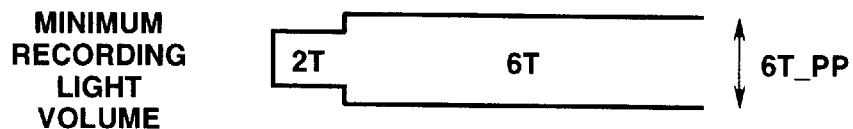
FIG.6A  MINIMUM RECORDING LIGHT VOLUME
FIG.6B  MEDIUM RECORDING LIGHT VOLUME
FIG.6C  MAXIMUM RECORDING LIGHT VOLUME
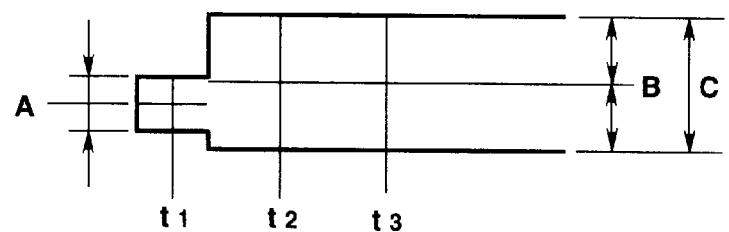
FIG.7

OPTICAL DISC-SHAPED RECORDING MEDIUM RECORDING DEVICE AND METHOD FOR SETTING ILLUMINATION POWER THEREOF

BACKGROUND OF THE INVENTION

1. Field of the Invention

This invention relates to a driving device for an ablation type write-once optical disc for illuminating a recording lightbeam for recording a recording pattern on the disc and a method for calibrating the recording light volume thereof.

2. Description of the Related Art

In a write-once type optical disc capable of recording/reproducing data by a user, a thin-film recording material not in need of development after recording is generally used, a laser light beam is converged onto this recording material for producing thermally irreversible changes for recording data thereon. These changes include, for example, ablation (hole-making), phase change and film deformation.

The driving device for an ablation write-once optical disc converges the laser light beam on the recording surface and forms a hole during marking for effecting recording, as shown in FIG. 1.

The length of the hole produced in the recording surface becomes shorter than an optimum value the lower the recoding light volume, that is the smaller the laser power, and becomes longer the higher the laser power, as shown in FIG. 2. The proportion of the length of the hole produced in the recording surface depends on heat diffusion as from the time the light emission pulse is turned off so that it is not dependent significantly on the length of the recording mark.

In general, the ablated write-once optical disc is of a structure in which the disc surface can be contacted with outside air, so that sensitivity to the laser power tends to be changed with lapse of time. Thus, with the driving device for an ablated type write-once optical disc, the recording light volume needs to be optimized prior to actual data recording for absorbing changes in disc sensitivity. In general, in calibrating the recording light volume, the recording light volume is swept for recording and the optimum recording light volume is estimated from the amplitude of the playback signal.

Meanwhile, the power margin for the ablated type write-once optical disc, that is the power margin capable of recording an optimum mark, is on the order of 30% and hence narrower than that for the magneto-optical disc which is on the order of 50%. In addition, with pulse width modulation recording, that is mark length recording, even the groove is destroyed if an excessive power is used for recording to render the servo unstable.

Therefore, in the recording device for the ablated type write-once optical disc, the recording light volume needs to be calibrated accurately without using an excessive power.

However, in calibrating the recording light volume in the driving device for the ablated type write-once optical disc, the excessive power (over-power) cannot be detected, while the optimum recording light volume cannot be directly searched, so that sufficient precision cannot be achieved.

SUMMARY OF THE INVENTION

It is therefore an object of the present invention to provide a driving device for a ablated type write-once optical disc in which the recording light volume can be calibrated accurately without using the over-power for reliably recording data on the ablated type write-once optical disc.

It is another object of the present invention to provide a method for calibrating the recording light volume in the driving device for an ablated type write-once optical disc in which the recording light volume can be calibrated accurately without using the over-power.

In one aspect, the present invention provides a recording device for recording data on a disc-shaped optical recording medium by illuminating a recording light beam thereon, including rotational driving means for running the disc-shaped optical recording medium in rotation, pattern generating means for generating a first pattern having a first period and a second pattern having a second period longer than the first period, recording light beam illuminating means for illuminating a recording light beam corresponding to the first pattern and another recording light beam corresponding to the second pattern for recording a first mark associated with the first pattern and a second pattern associated with the second pattern, movement means for the recording light beam illuminating means for moving the recording light beam illuminating means to a desired position along the radius of the disc-shaped optical recording medium, playback signal outputting means for illuminating a playback light beam on the first and second marks for reproducing a playback signal based on the reflected light beam of a playback light beam from the disc-shaped optical recording medium, asymmetry amount calculating means for calculating the asymmetry amount based on an amplitude level of the playback signal derived from the first mark and an amplitude level of the playback signal derived from the second mark and illumination power setting means for setting the illuminating power of the recording light beam illuminating means based on the asymmetry amount.

In another aspect, the present invention provides a method for setting an illumination power for a disc-shaped optical recording medium configured for recording data by illuminating a recording light beam on the disc-shaped optical recording medium, including a rotationally driving step of rotationally driving the disc-shaped optical recording medium, a pattern generating step of generating a first pattern having a first period and a second pattern having a second period longer than the first period, a recording light beam illuminating step of illuminating recording light beams corresponding to the first pattern and the second pattern for recording the first mark corresponding to the first pattern and the second mark corresponding to the first pattern on the disc-shaped optical recording medium, a servo step of performing control for illuminating the recording light beam at a pre-set focus or position on the disc-shaped optical recording medium, a movement step of moving the recording light beam illuminating means to a desired radial position of the disc-shaped optical recording medium, a playback signal outputting step of illuminating a playback light beam on the first and second marks for outputting a playback signal based on the reflected light beam of the playback light beam from the disc-shaped optical recording medium, an asymmetry amount calculating step of calculating an asymmetry amount based on the amplitude level of the playback signal derived from the first mark and the amplitude level of the playback signal derived from the second mark and an illuminating power setting step of setting an illuminating power of the recording light beam illumination means based on the asymmetry amount.

BRIEF DESCRIPTION OF THE DRAWINGS

FIG. 6A shows the signal level of the playback output of the 2T/6T pattern with respect to the minimum recording light volume.

FIG. 6B shows the signal level of the playback output of the 2T/6T pattern with respect to the medium recording light volume.

FIG. 6C shows the signal level of the playback output of the 2T/6T pattern with respect to the maximum recording light volume.

FIG. 7 shows asymmetry of the playback output of the 2T/6T pattern.

DESCRIPTION OF THE PREFERRED EMBODIMENTS

Figure 1:
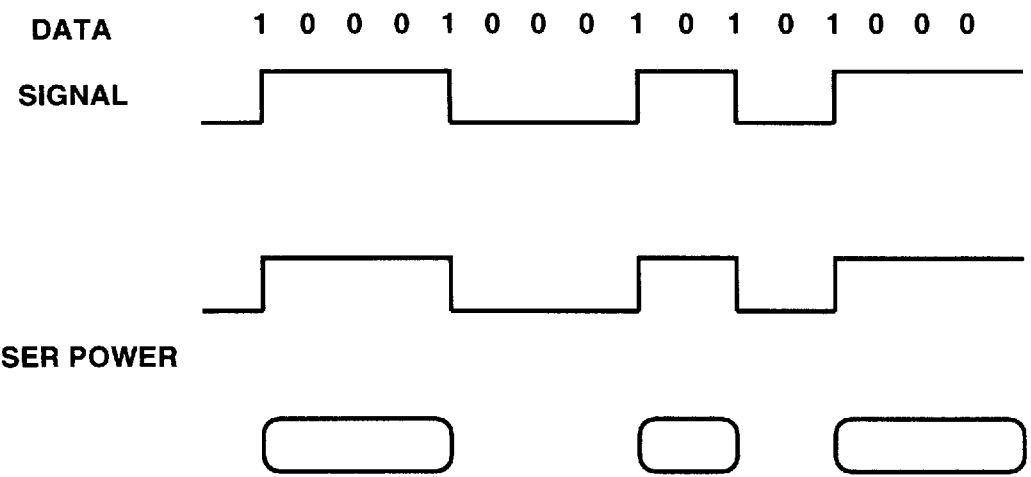
FIG. 1 schematically shows the recording contents in the driving device for an ablated type write-once optical disc.
Figure 2:
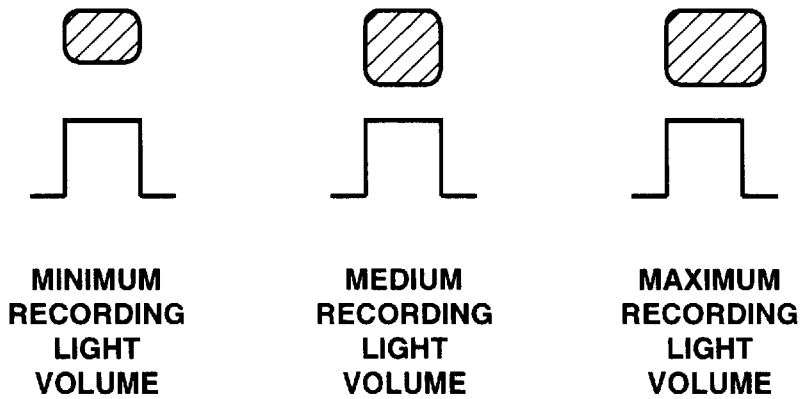
FIG. 2 schematically shows the relation between the by the driving device for an ablated type write-once optical disc shown in FIG. 1.

Referring to the drawings, preferred embodiments of the present invention will be explained in detail.

Figure 3:
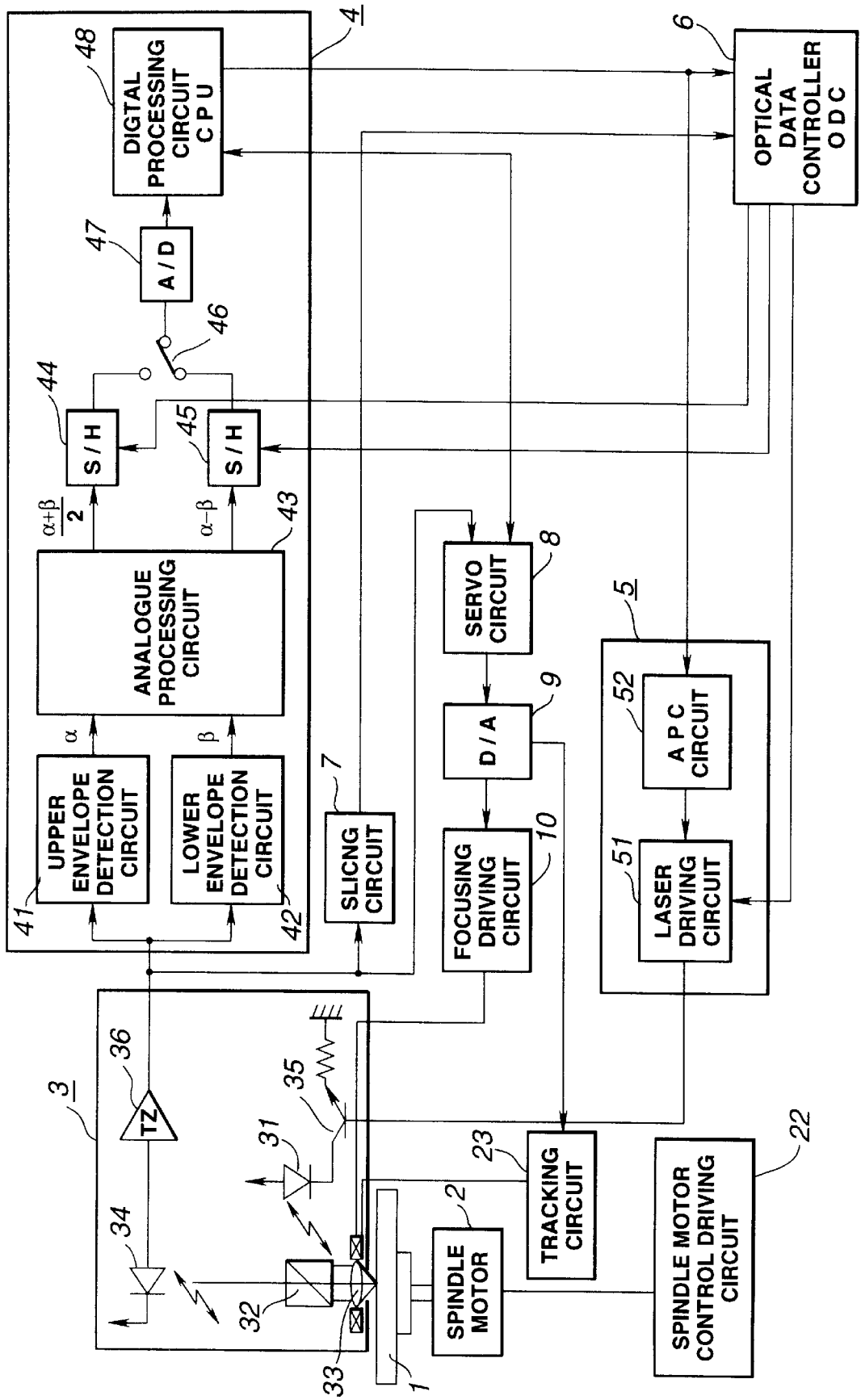
FIG. 3 is a block diagram showing the structure of a disc driving device embodying the present invention.

The present invention is applied to, for example, a disc recording device configured as shown in the block diagram of FIG. 3.

The disc recording device according to the present invention is such a device in which an ablated write-once optical disc 1 is run in rotation by a spindle motor 2 driven under control by a spindle motor driving control circuit 22, as the same time as the recording surface of the ablated write-once optical disc 1 is scanned by a laser light beam by an optical head 3 for optical data recording/reproduction. Thus, the disc recording device includes an optimum recording light volume decision unit 4, supplied with the playback output by the optical head 3, a laser driving controller 5 for controlling the laser light volume of the optical head 3 and an optical recording data controller 6 for controlling the laser driving controller 5.

The optical head 3 operates as recording means for recording a recording pattern on the ablated write-once optical disc 1 by illuminating a recording light beam thereon, while also operating as reproducing means for reproducing the recording pattern from the ablated write-once optical disc 1 by illuminating a playback light beam thereon. Thus, the optical head 3 includes a laser diode 31, a beam splitter 21, an objective lens 33 and a photodiode 34.

The laser diode 31 is flown through by a driving current via a driving transistor 35 for radiating the laser light beam corresponding to the driving current as the above-mentioned recording/reproducing light beam. The laser light beam, radiated by the laser diode 31, is led via beam splitter 32 to the objective lens 33 so as to be converged on the recording surface of the ablated write-once optical disc 1. The laser light beam thus converged on the recording surface of the ablated write-once optical disc 1 is reflected thereby so as to be guided from the objective lens 33 via beam splitter 32 to the photodiode 34. The optical head 3 converts the light current corresponding to the light volume of the reflected light beam by a trans-impedance amplifier 36 into voltage which is then amplified to give a playback output. The above-mentioned reflected light beam is obtained by detecting the reflected light beam from the recording surface of the ablated write-once optical disc 1 by the photodiode 34.

The playback output obtained by the optical head 3 is supplied to the optimum recording light volume decision unit 4, a slicing circuit 7 and to a servo circuit 8.

The slicing circuit 7 slices the playback output obtained by the optical head 3 to form a binary-valued output which is sent as playback data to the optical data controller 6. The servo circuit 8 detects the focusing error or tracking error from the playback output obtained by the optical head 3 for generating a variety of servo signals, such as focusing servo signals or tracking servo signals. This servo circuit 8 generates a variety of the servo signals by digital signal processing and sends the servo signal thus generated via D/A converter 9 to a focusing driving circuit or to a timing control circuit. If a signal for controlling the rotational velocity of the spindle motor is contained in the playback output, the servo signal for the spindle motor is transmitted via D/A converter 9 to a spindle motor driving circuit 22.

The optimum recording light volume decision unit 4 includes an upper envelope detection circuit 41 and a lower envelope detection circuit 42, fed with the playback output obtained by the optical head 3, and an analog processing circuit 43 fed with detection outputs of the upper envelope detection circuit 41 and the lower envelope detection circuit 42. The optimum recording light volume decision unit 4 includes sample-and-hold circuits 44, 45 fed with processing outputs of the upper envelope detection circuit 41 and the lower envelope detection circuit 42, an A/D converter 47 fed with sample-held outputs of the sample-and-hold circuits 44, 45 via changeover switch 46 and a digital processing circuit 48 fed with output data of the A/D converter 47.

In this optimum recording light volume decision unit 4, the upper envelope detection circuit 41 detects the upper envelope of the playback output obtained by the optical head 3. The lower envelope detection circuit 42 detects the lower envelope of the playback output obtained by the optical head 3. The analog processing circuit 43 calculates the average signal level $(\alpha+\beta)/2$ of the playback output and the maximum amplitude $(\alpha-\beta)$ from the signal level $\alpha$ of the upper envelope detected by the upper envelope detection circuit 41 and the signal level $\beta$ of the lower envelope detected by the lower envelope detection circuit 42. The processing outputs specifying the average signal level $(\alpha+\beta)/2$ of the playback output and the maximum amplitude $(\alpha-\beta)$, calculated by the analog processing circuit 43, are sample-held by the sample-and-hold circuits 44, 45, respectively, and supplied via changeover switch 46 to the A/D converter 47 so as to be thereby digitized and sent to the digital processing circuit 48.

The digital processing circuit 48 is designed for determining the optimum recording light volume from the average signal level $(\alpha+\beta)/2$ and the maximum amplitude $(\alpha-\beta)$ of the playback output digitized and supplied by the A/D converter 47.

The laser driving controller 5 includes a laser driving circuit 51 for driving a driving transistor 35 of the laser diode 31 and an automatic power control (APC) circuit 52 connected to the laser driving circuit 51.

The APC circuit 52 controls the laser driving circuit 51 for permitting the laser light of a light volume corresponding to the light volume data of the recording light volume/ reproducing light volume supplied by the digital processing circuit 48 of the optimum recording light volume decision unit 4. The laser driving circuit 51 controls the driving transistor 35 of the laser diode 31 for radiating the laser light of the recording light volume and the laser light of the reproducing light volume from the laser diode 31 during the logical '1' period and the logical '0' period, respectively, of the recording data supplied by the optical data controller 6.

The optical data controller 6 controls the data recording position based on the playback data supplied by the slicing circuit 7, while controlling the sample-holding timing by the sample-and-hold circuits 44, 45 of the optimum recording light volume decision unit 4.

Figure 4:
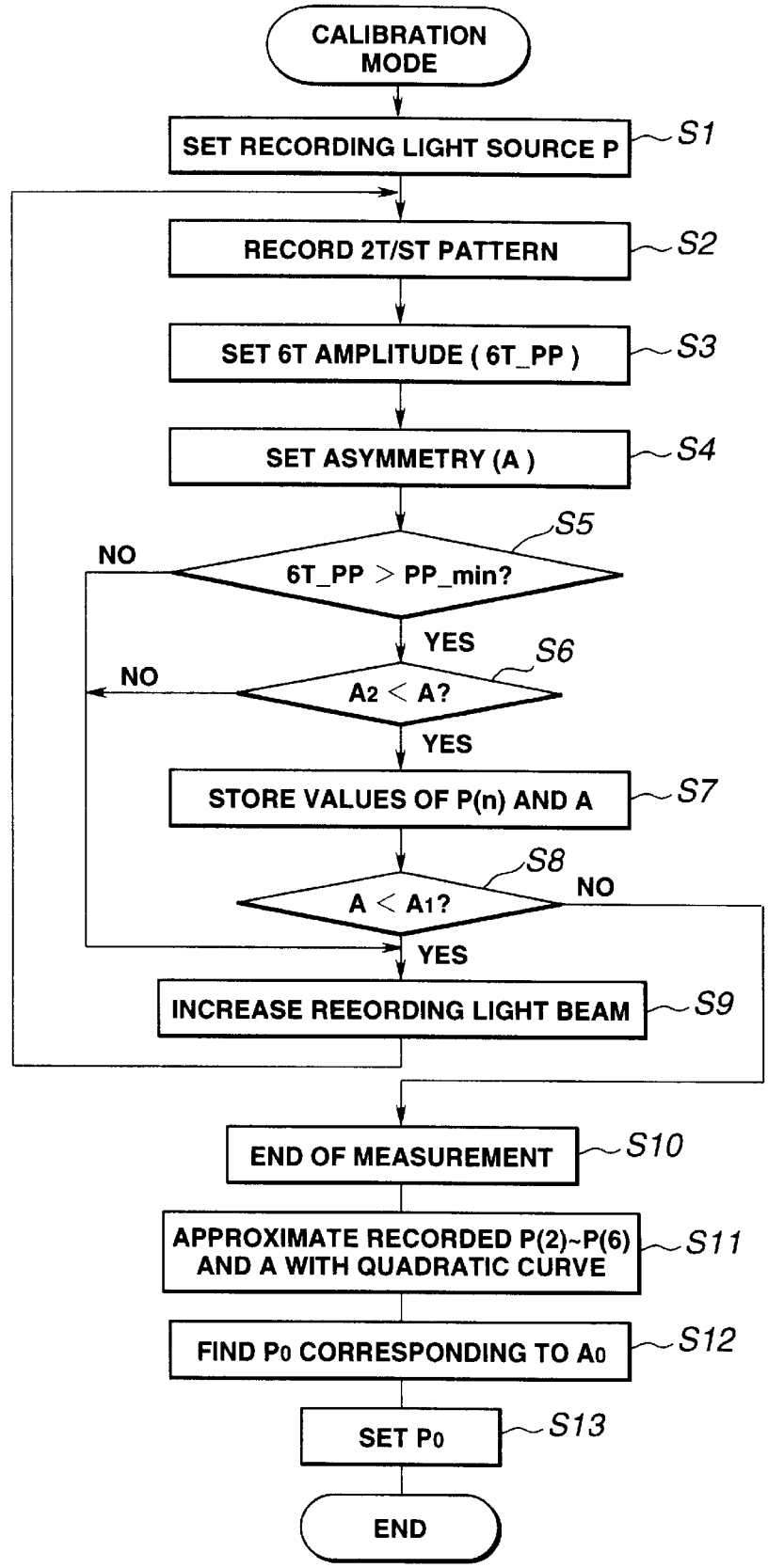
FIG. 4 is a flowchart showing the operation for the calibration mode of the disc driving device shown in FIG. 3.

Prior to proceeding to recording of actual data, the disc driving device calibrates the recording light volume in accordance with the flowchart of FIG. 4.

That is, in the calibration mode, the optimum recording light volume decision unit 4 at step S1 sets the recording light volume to a sufficiently low starting light volume Pstart. At the next step S2, the optimum recording light volume decision unit 4 causes the optical data controller 6 to control the laser driving circuit 51 to cause the optical head 3 to record two different recording patterns of different repetition periods, herein 2T/6T patterns, on the ablation write-once optical disc 1.

At step S3, the 2T/6T patterns recorded on the ablation write-once optical disc 1 are reproduced by the optical head 3 and the amplitude of the 6T pattern (6T_PP) is measured from the playback output. Then, at step S4, an asymmetry A is measured.

For measuring the 6T pattern amplitude (6T_PP) and the asymmetry A, the average signal level of the playback output $(\alpha+\beta)/2$ obtained by the analog processing circuit 43 is sample-held at the playback timing of the 2T-pattern and at the playback timing of the 6T-pattern by the sample-and-hold circuit 44 so as to be taken via A/D converter 47 in the digital processing circuit 48. Similarly, the maximum amplitude $(\alpha-\beta)$ obtained by the analog processing circuit 43 is sample-held at the playback timing of the 6T-pattern by the sample-and-hold circuit 44 so as to be taken via A/D converter 47 in the digital processing circuit 48.

Figure 5:
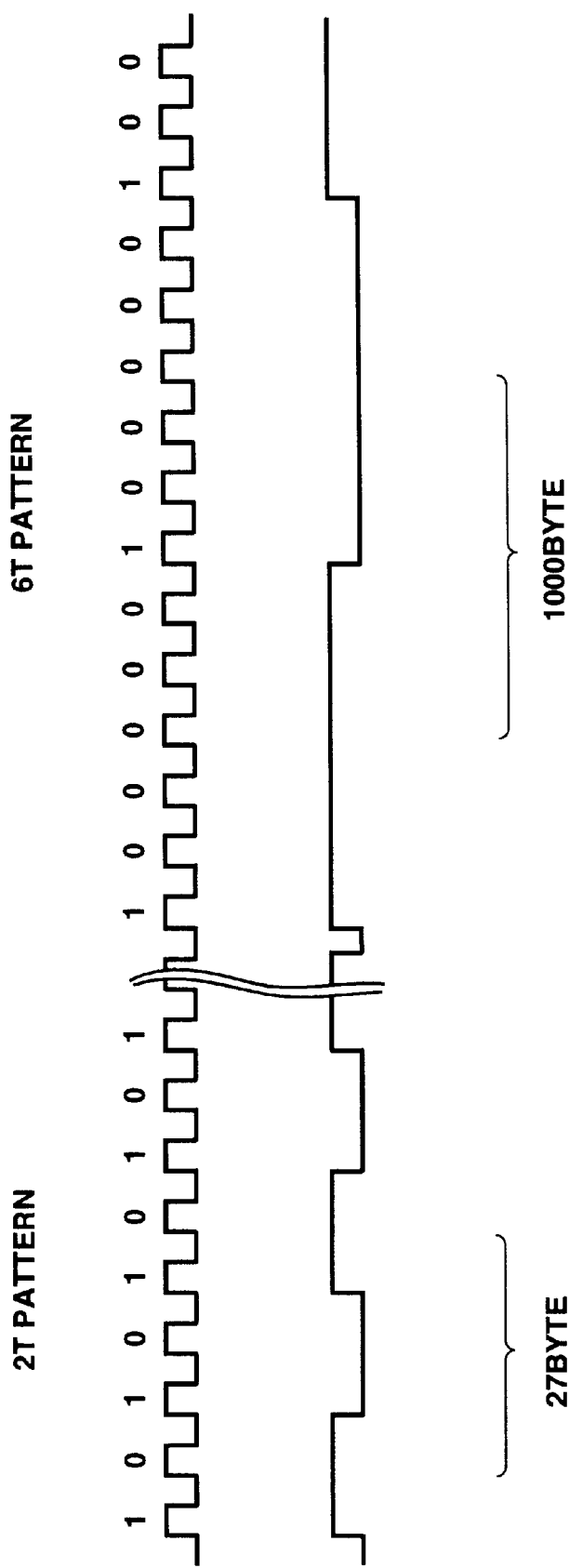
FIG. 5 shows a 2T/6T pattern recorded in the ablation mode.

If two different recording patterns with different repetition periods, herein a 2T pattern of repetition of 2T mark/space followed by a 6T pattern of repetition of 6T mark/space, are recorded on the ablation write-once optical disc, as shown in FIG. 5, the playback output is changed responsive to the recording light volume as indicated in FIGS. 6A, 6B and 6C.

Then, as shown in FIG. 7, the digital processing circuit 48 finds the asymmetry A by $$A=(b-a)/c+0.5$$

where a is the average signal level of the playback output $(\alpha+\beta)/2$ of the 2T pattern sample-held at a playback timing t1 of the 2T pattern, b is the average signal level of the playback output $(\alpha+\beta)/2$ of the 6T pattern sample-held at a playback timing t2 of the 6T pattern and c is the maximum amplitude of the playback output $(\alpha-\beta)$ of the 6T pattern sample-held at the playback timing t2 of the 6T pattern. The maximum amplitude of the playback output $(\alpha-\beta)=c$ of the 6T pattern is also used as the amplitude of the 6T pattern (6T_PP).

At the next step S5, it is judged whether or not the measured amplitude (6T_PP) is larger than a pre-set amplitude PP_min.

Figure 8:
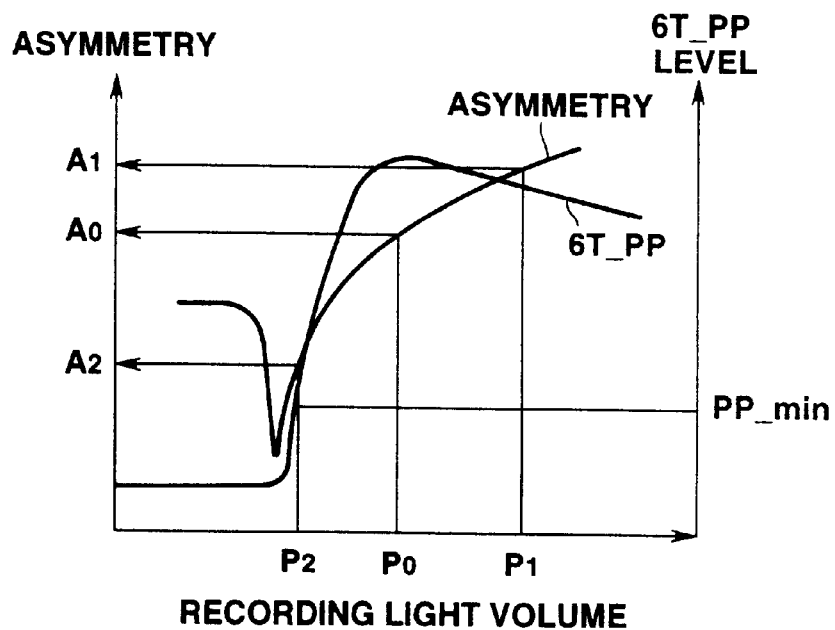
FIG. 8 is a graph showing the state of changes in amplitude of the 6T pattern and the state of changes in asymmetry with respect to recording light volume of the payback output of the 2T/6T pattern.
Figure 9:
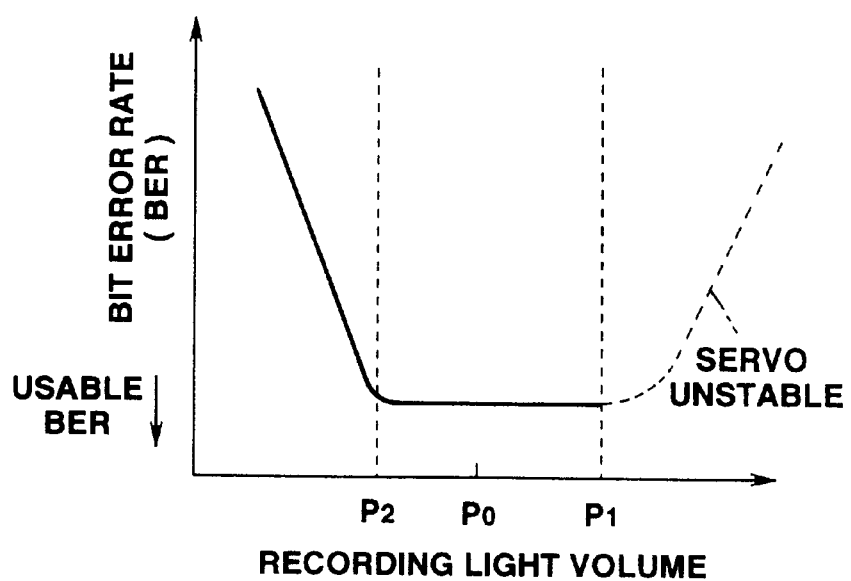
FIG. 9 is a graph showing the state of changes in the bit error rate with respect to the recording light volume of the playback output of the 2T/6T pattern.
Figure 10:
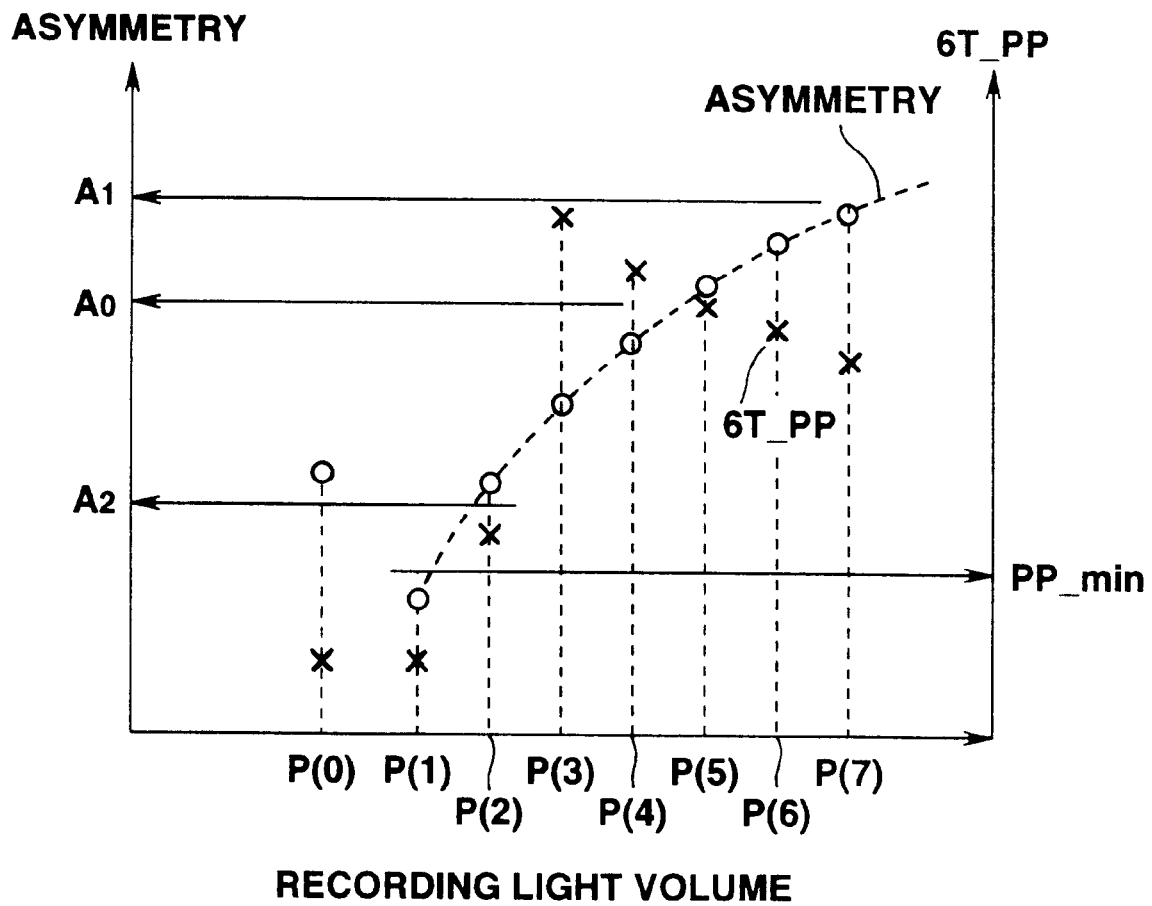
FIG. 10 is a graph showing the recording light volume P(n) of the 2T/6T pattern in the above calibration mode and the amplitude of the 6T pattern (6T_PP) of the playback output with respect to asymmetry A.

If the recording light volume is changed, the playback output obtained on recording the 2T/6T patterns on the ablation write-once optical disc is such that the amplitude of the playback output of the 6T pattern (6T_PP) and the amount of asymmetry A are related with each other in a specified fashion with the recording light volume, as shown in FIG. 8, whilst the byte error rate BER and the recording light volume are related with each other in a specified fashion. If the recording light volume is lower than P2, the recording state becomes incomplete, with the byte error rate BER being decreased, as shown in FIG. 9. If the recording light volume is higher than P1, servo control becomes unstable, thus lowering the byte error rate BER. Therefore, the optimum recording light volume P0 is intermediate between the recording light volume P2 and the recording light volume P1.

That is, if the recording light volume is increased, the amplitude of the playback output of the 6T pattern (6T_PP) presents characteristics such that the amplitude starts abruptly to be increased with the recording light volume P2 as a boundary. This is because holes start to be formed in the recording surface with the recording light volume P2 as the boundary. Thus, by setting the minimum value of the amplitude PP_min of the amplitude of the playback output at which the hole can be judged to have been formed, it becomes possible to detect the optimum recording light volume P0 reliably.

If the result of decision at step S5 is 'YES', that is if the amplitude of the 6T pattern (6T_PP) is larger than the pre-set amplitude PP_min, processing transfers to step S6. If the result of decision at step S5 is 'NO', that is if the amplitude of the 6T pattern (6T_PP) is smaller than the pre-set amplitude PP_min, processing transfers to step S9 to increase the recording light volume. Then, processing reverts to step S2 to repeat the processing of the steps S2 to S5.

Since the asymmetry A is increased monotonously for the recording light volume larger than the recording light volume P2, as shown in FIG. 8. Therefore, the optimum light volume P0 can be detected from the asymmetry A by searching the asymmetry A0 corresponding to the optimum recording light volume P0. Meanwhile, the optimum light volume P0 is determined by how much allowance is left above and below a recording light volume.

With the recording light volume lower than P2, recording is insufficient, such that the value of asymmetry A is not reliable.

Thus, at step S6, it is judged whether or not the measured value of asymmetry A is larger than the pre-set value A2.

If the result of decision at step S6 is 'YES', that is if the amount of asymmetry A is larger than the pre-set value A2, processing transfers to step S7. If the result of decision at step S6 is NO, that is if the amount of asymmetry A is lesser than the pre-set value A2, processing transfers to step S9 for increasing the recording light volume. Then, processing reverts to step S2 to repeat the processing of steps S2 to S5.

At the next step S7, it is judged whether or not the measured value of asymmetry A is smaller than the pre-set value A1.

If the result of decision at step S7 is 'YES', that is if the asymmetry A is smaller than the pre-set value A1, servo can be applied normally, so that processing now transfers to step S9 for increasing the recording light volume. Then, processing reverts to step S2 to repeat the processing of steps S2 to S5. In this manner, the measurement operation for calibration is carried out by changing the optimum recording light volume P(n) several times within the range of from the recording light volume P2 to the recording light volume P1 where these exists the optimum recording light volume P0. The recording light volumes P2 to P6 and asymmetry A therefor, are stored as shown for example in FIG. 1O. If the result of decision at step S7 is NO, that is if the asymmetry A is larger than 1, servo tends to become unstable, so that the recording light volume should not be increased to higher than the current recording light volume P. Thus, processing transfers to step S10 to terminate measurement for calibration.

At the next step S11, the recording light volumes P2 to P6 and asymmetry A stored in a memory are approximated by quadratic curves. At step S12, the optimum recording light volume P0 corresponding to asymmetry A0 is calculated.

It is noted that the amount of asymmetry A is changed in the rate of change from the recording light volume P2 to the recording light volume P1, so that approximation by a quadratic curve is more favorable in fitting and hence in accuracy than that by a straight line, as shown in FIG. 1O.

At the next step S13, the optimum recording light volume P0, thus determined, is set, to terminate calibration of the recording light volume.

Specifically, the optimum recording light volume decision unit 4, supplied with the playback output of the optical head 3, the laser driving controller 5 for controlling the laser light volume of the optical head 3 and the optical recording data controller 6 controlling the laser driving controller 5, in the above-described disc driving device, operates as calibration means for causing the optical head 3 to record the two different recording patterns having different repetitive periods on the ablation write-once type optical disc 1, detecting the amount of asymmetry from playback outputs of the two recording patterns obtained by the optical head 3, determining the optimum recording light volume P0 based on the amounts of asymmetry for the various recording light volumes and for controlling the light volume of the recording light illuminated on the ablation write-once optical disc 1. With the present disc driving device, having such calibration means, the recording light volume can be calibrated precisely prior to recording of actual data, thus positively realizing recording of the actual data.

Also, with the present disc driving device, since the optical head 3 is controlled by the laser driving controller 5 based on the amount of asymmetry detected by the optimum recording light volume decision unit 4, for controlling the upper limit of the recording light volume, the recording light volume can be calibrated precisely prior to recording of actual data without using an over-power.

Moreover, with the present disc driving device, since the optimum recording light volume decision unit 4 discriminates the incomplete recording state and the complete recording state of the write-once optical disc 1 based on the maximum amplitude of the playback amplitude of the playback output of the 6T pattern and calculates the amount of asymmetry A from the average signal levels a and b of the 6T/2T patterns in the completely recorded state and the maximum amplitude c for determining the optimum recording light volume P0, the amount of asymmetry can be detected reliably, while the recording light volume can be calibrated precisely based on the amount of asymmetry.

With the driving device for the ablation write-once optical disc according to the present invention, provided with calibration means for recording two different recording patterns of different repetitive periods on a ablation write-once optical disc, detecting the amount of asymmetry from the playback outputs of the two different recording patterns obtained by the reproducing means, determining the optimum recording light volume of the ablation write-once optical disc based on the amount of asymmetry for various recording light volumes and for controlling the light volume of the recording light beam illuminated on the disc to the above-mentioned optimum recording light volume, the recording light volume can be calibrated accurately prior to recording of the actual data thus assuring reliable recording of the actual data.

Moreover, with the driving device for the ablation write-once optical disc according to the present invention, the complete recording state and the incomplete recording state of the write-once optical disc can be discriminated from each other by the calibration means based on the maximum amplitude of the playback output of the long-term recording pattern detected by the detection means, and the amount of asymmetry is determined based on the maximum amplitude and the average signal levels of the playback outputs of the two recording patterns in the completely recorded states for determining the optimum recording light volume, thus enabling calibration of the recording light volume based on the amount of asymmetry.

With the method for calibrating the recording light volume according to the present invention, two different recording patterns of different repetition periods are recorded at various recording light volumes on an ablation write-once optical disc, the amount of asymmetry is detected from the playback output of the recording pattern and the optimum recording light volume of the ablation write-once optical disc is determined based on the detected asymmetry amount for calibrating the recording light volume based on the amount of asymmetry.

With the method for calibrating the recording light volume according to the present invention, the upper limit of the recording light volume is limited based on the detected amount of asymmetry for determining the optimum recording light volume of the ablation write-once optical disc, thus achieving calibration of the recording light volume with high accuracy without using an over-power.

Also, with the method for calibrating the recording light volume according to the present invention, in which the maximum amplitude of the playback output of the long-term recording pattern of the two recording patterns having different repetitive periods is detected, the complete recording state of the ablation write-once optical disc is discriminated from the incomplete recording stat thereof based on the detected maximum amplitude and the amount of asymmetry is detected from the playback output of the two different recording patterns of the different repetitive periods in the complete recording state, the amount of asymmetry can be detected reliably, so that the recording light volume can be calibrated high accurately based on the amount of asymmetry.

What is claimed is:

1. A recording device for recording data on a disc-shaped optical recording medium by illuminating a recording light beam thereon, comprising:

rotational driving means for running the disc-shaped optical recording medium in rotation;

pattern generating means for generating a first pattern having a first period and a second pattern having a second period longer than said first period;

recording light beam illuminating means for illuminating a recording light beam corresponding to said first pattern and another recording light beam corresponding to said second pattern for recording a first mark associated with the first pattern and a second pattern associated with the second pattern;

movement means for said recording light beam illuminating means for moving said recording light beam illuminating means to a desired position along the radius of said disc-shaped optical recording medium;

playback signal outputting means for illuminating a playback light beam on said first and second marks for reproducing a playback signal based on the reflected light beam of a playback light beam from said disc-shaped optical recording medium;

asymmetry amount calculating means for calculating the asymmetry amount based on an amplitude level of the playback signal derived from said first mark and an amplitude level of the playback signal derived from said second mark; and illumination power setting means for setting the illuminating power of said recording light beam illuminating means based on said asymmetry amount.

2. The recording device for recording data on an optical recording medium as claimed in claim 1 wherein said asymmetry calculating means includes envelope detection means for detecting an amplitude level of upper and lower envelopes of said playback signal outputted by said playback signal outputting means;

calculation means for calculating said asymmetry amount by an equation (b−a)c+(constant) wherein a is an average amplitude level of amplitude levels of an upper envelope and lower level of the playback signal derived from said first mark;

b is an average amplitude level of amplitude levels of the upper and lower envelopes of the playback signal derived from said second mark; and c is a maximum amplitude level of a playback signal as found by the difference in amplitude level between the upper and lower envelopes of the playback signal derived from said second mark.

3. The recording device for recording data on an optical recording medium as claimed in claim 2 further comprising:

memory means for storage of a first maximum amplitude level as found by a difference in amplitude level between an upper envelope and a lower envelope of the playback signal derived from said second mark recorded with the minimum illumination power for which a bit error rate of the playback signal outputted by the playback signal outputting means becomes not higher than a pre-set value; and comparator means for comparing said first maximum amplitude level and a second maximum amplitude level as found by a difference in amplitude level between an upper envelope and a lower envelope of a playback signal derived from the second mark actually outputted by said playback signal outputting means;

said illumination power setting means raising the illumination power when the second maximum amplitude level is judged by said comparator means to be smaller than said first maximum amplitude level.

4. The recording device for recording data on an optical recording medium as claimed in claim 1 wherein said first pattern is a repetition pattern of a period 2T equal to twice the period of a channel clock for data recording and wherein said second pattern is a repetition pattern of a period 6Y equal to six times the period of said channel clock.

5. The recording device for recording data on an optical recording medium as claimed in claim 1 wherein said optical recording medium is an ablation write-once optical disc.

6. The recording device for recording data on an optical recording medium as claimed in claim 1 further comprising:

memory means for storage of a first asymmetry amount of a playback signal derived from first and second marks actually outputted by said playback signal outputting means and said first asymmetry amount; and comparator means for comparing said first asymmetry amount and a second asymmetry amount of the playback signal derived from said first and second marks and which is actually outputted by said playback signal outputting means;

said illumination power setting means raising the illumination power when the second asymmetry is judged by said comparator means to be smaller than said first asymmetry.

7. The recording device for recording data on an optical recording medium as claimed in claim 1 wherein said recording illumination means includes servo means for illuminating said recording light beam at a pre-set focus or position on said disc-shaped recording medium; said recording device further comprising:

memory means for storage of a first asymmetry amount of the playback signal derived from said first and second marks recorded with the maximum illuminating power recording light beam for which the servo means is not stable;

comparator means for comparing said first asymmetry amount and a second asymmetry amount of the playback signal derived from said first and second marks actually outputted by said playback signal outputting means; and control means for controlling said recording power illuminating means so as not to illuminate the recording light beam if the second asymmetry is judged by said comparator means to be larger than said first asymmetry.

8. The recording device for recording data on an optical recording medium as claimed in claim 1 further comprising:

control means for causing said illumination power setting means to set a plurality of different illumination powers and for causing said recording light beam illumination means to illuminate recording light beams corresponding to said first and second patterns with said illumination powers on said disc-shaped recording medium for recording first and second marks corresponding to said plural illumination powers on said disc-shaped recording medium;

memory means for storing a first asymmetry amount of a playback signal derived from said first and second marks recorded with a recording light beam of the optimum illumination power; and optimum illumination power calculating means for generating an approximate quadratic curve based on said plural different illumination power values and plural asymmetry amounts calculated from an amplitude level of the playback signal based on said plural first and second marks and for calculating an optimum illumination power corresponding to said asymmetry amount from said quadratic curve.

9. A method for setting an illumination power for a disc-shaped optical recording medium configured for recording data by illuminating a recording light beam on said disc-shaped optical recording medium, comprising:

a rotationally driving step of rotationally driving the disc-shaped optical recording medium;

a pattern generating step of generating a first pattern having a first period and a second pattern having a second period longer than said first period;

a recording light beam illuminating step of illuminating recording light beams corresponding to said first pattern and said second pattern for recording the first mark corresponding to said first pattern and the second mark corresponding to said first pattern on said disc-shaped optical recording medium;

a servo step of performing control for illuminating said recording light beam at a pre-set focus or position on said disc-shaped optical recording medium;

a movement step of moving said recording light beam illuminating means to a desired radial position of the disc-shaped optical recording medium;

a playback signal outputting step of illuminating a playback light beam on said first and second marks for outputting a playback signal based on the reflected light beam of the playback light beam from said disc-shaped optical recording medium;

an asymmetry amount calculating step of calculating an asymmetry amount based on the amplitude level of the playback signal derived from said first mark and the amplitude level of the playback signal derived from said second mark; and an illuminating power setting step of setting an illuminating power of said recording light beam illumination means based on said asymmetry amount.

10. The illumination power setting method as claimed in claim 9 further comprising:

a first storage step of storage of the first asymmetry amount of the playback signal derived from the first and second marks recorded with the recording light beam of the minimum illumination power for which a bit error rate of a playback signal outputted by said playback signal outputting means becomes not larger than a pre-set value;

a first comparison step of comparing said first asymmetry amount to the second asymmetry amount of the playback signal derived from said first and second marks actually outputted by said playback signal outputting means;

a step of raising the illumination power when said first comparison step finds the second asymmetry to be smaller than said first asymmetry;

a recording step of illuminating on said disc-shaped recording medium recording light beams corresponding to said first pattern or said second pattern with plural different illuminating power values for recording on said disc-shaped recording medium plural first and second marks corresponding to said plural illuminating powers;

a second storage step of storing a third asymmetry amount of the playback signal derived from the first and second marks recorded with a recording light beam of an optimum illuminating power;

an optimum illumination power calculating step of generating an approximate quadratic curve based on plural asymmetry amounts calculated from the amplitude level of the playback signal derived from said plural different illuminating powers and said plural first and second marks and for calculating an optimum illumination power corresponding to said third asymmetry amount from said quadratic curve;

a third storage step for storage of a fourth asymmetry amount of the playback signal derived from said first and second marks recorded with the maximum illuminating power recording light beam for which the servo means is not stable;

a second comparison step for comparing said fourth asymmetry amount and a fifth asymmetry amount of the playback signal derived from said first and second marks actually outputted by said playback signal outputting means; and a control step for controlling said recording power illuminating means so as not to illuminate the recording light beam if the fifth asymmetry is judged by said second comparison step to be larger than said fourth asymmetry.

11. The illumination power setting method as claimed in claim 10 wherein said asymmetry calculating step includes envelope detection means for detecting an amplitude level of upper and lower envelopes of said playback signal outputted by said playback signal outputting means;

calculation means for calculating said asymmetry amount by an equation $(b-a)c+(constant)$ wherein a is an average amplitude level of amplitude levels of an upper envelope and lower envelope of the playback signal derived from said first mark;

b is an average amplitude level of amplitude levels of the upper and lower envelopes of the playback signal derived from said second mark; and c is a maximum amplitude level of a playback signal as found by the difference in amplitude level between the upper and lower envelopes of the playback signal derived from said second mark.

12. The illumination power setting method as claimed in claim 11 further comprising:

a fourth storage step of storage of a first maximum amplitude level as found by the difference in amplitude level between the upper and lower envelopes of the playback signal derived from the second mark recorded with the minimum illumination power for which the bit error rate of the playback signal becomes not larger than a pre-set amount;

a third comparison step for comparing said first maximum amplitude level and a second maximum amplitude level as found by the difference in amplitude level between upper and lower envelopes of the actually outputted playback signal derived from the first and second marks; and a step of raising the illumination power if said second maximum amplitude level is found to be smaller than said first maximum amplitude level.

13. The illumination power setting method as claimed in claim 12 wherein said first pattern is a repetitive pattern of a period 2T equal to twice the period of the channel clocks used in recording data;

said second pattern being a repetitive pattern of a period 6T equal to six times the period of said channel clocks.

14. The illumination power setting method as claimed in claim 12 wherein said disc-shaped optical recording medium is an ablation write-once type optical disc.

* * * * *